Patented Oct. 10, 1950

2,525,627

UNITED STATES PATENT OFFICE 2,525,627

TITANATE COMPOSITION

Eugene Wainer, Cleveland Heights, Ohio, assignor, by mesne assignments, to National Lead Company, New York, N. Y., a corporation of New Jersey No Drawing. Original application November 12, 1942, Serial No. 465,387. Divided and this application July 16, 1948, Serial No. 39,177

6 Claims. (Cl. 106—39)

The present application, which relates to ceramic materials, is a division of my application Serial No. 465,387 (now Patent No. 2,467,169, April 12, 1949) which was filed on November 12, 1942. The invention described and claimed in the present application comprises ceramic materials in which the major constituents consist of combinations of titanates, one of which is lead titanate.

The use of compounds of titanium in the production of dielectric materials is known but, according to the prior art, it has been generally believed that most desirable electrical characteristics are achieved in the case of compositions having an excess of titanium dioxide. According to the present invention, it is found that manifold higher dielectric constants are attainable by forming ceramic dielectric bodies wherein there is substantially no free titanium dioxide and wherein a mixture of titanates of more than one metal is employed.

In no case can the dielectric characteristics of the ceramic materials of the present invention be approached or approximated by a mixture of a titanate with $TiO_2$, or by a single titanate alone, or by a mixture of titanates plus material quantities of $TiO_2$. The controlling factors in the formation of the present bodies are the presence of more than one titanate and the substantial absence of free rutile ($TiO_2$), in the final product.

The precise reason for the surprising dielectric results attained by mixtures of more than one titanate, as compared with bodies comprising single titanates, is not definitely and certainly known, but it has been found that peak dielectric constants of various mixtures of titanates are found to occur when the combined titanates have a definite gram-molecular ratio, of which more will appear later herein.

Titanium dioxide ceramic dielectric bodies are a relatively recent development and those thus far known generally have dielectric constants in the neighborhood of 100. Some of the mixtures of titanates prepared in accordance with the present invention have dielectric constants between 3000 and 4000, and dielectric constants of 1000 are commonly encountered.

While various titanates may be mixed interchangeably to produce ceramic dielectric bodies, according to the present invention, compositions of titanates of barium or strontium or combinations thereof with lead titanate, are found to yield surprising results.

The novel compositions of the present invention consist of fired mixtures of prefired titanates prepared by combining chosen lots of the foregoing oxides with titanium dioxide. In all cases, the titanate compositions are not to contain $TiO_2$ in amounts exceeding 50 gram-molecular (molar) percent. For the various compositions set forth in the ensuing examples, the percentages by weight of $TiO_2$ are from 25 to 45 per cent with 30 to 40 per cent by weight of $TiO_2$ preferred. It is, however, the stated gram-molecular percentage which is important because of the desire to produce the titanate substantially free of crystalline rutile and with titanium oxide present only in chemical combination with the other titanate-forming oxide. To further this result, it is better in some cases to have in the batch of mixed titanates, before firing, a slight excess of one of the constituents which react with rutile to form titanates so that the fired batch has definitely less than 50 gram-molecular per cent of $TiO_2$.

As examples of the high dielectric ceramic compositions of the foregoing general discussion, reference will now be had to certain groups or lots of mixtures of titanates by way of example, comprising mixtures of titanates selected from among barium titanate, strontium titanate, and lead titanate.

*Lot I.*—Mixtures of $BaTiO_3$ and $PbTiO_3$, wherein the $BaTiO_3$ is in any proportion between 20% and 95%, weight with the $PbTiO_3$ varying correspondingly from 80% to 5% by weight.

*Lot II.*—Mixtures as in Lot I with up to 10 molar per cent of BaO added to the raw batch before firing.

*Lot III.*—Mixtures of $SrTiO_3$ and $PbTiO_3$, wherein the $SrTiO_3$ is in any proportion between 20% and 95% by weight with the $PbTiO_3$ varying correspondingly from 80% to 5% by weight.

*Lot IV.*—Mixtures as in Lot III with up to 10 molar per cent of SrO added to the raw batch before firing.

*Lot V.*—Mixtures of $SrTiO_3$, $BaTiO_3$ and $PbTiO_3$. In this group the $PbTiO_3$ constituent need not exceed 20% by weight and as low as 2% by weight of the $SrTiO_3$ and the $BaTiO_3$ may vary with one of the oxides of such alkaline earth combination in any proportion between 5% and 95% by weight and the other oxide being complementary between 95% to 5% by weight.

*Lot VI.*—Mixtures as in Lot V but with up to 10 molar per cent of either SrO or BaO or a mixture of the two added to the raw batch before firing.

The bodies are prepared by the addition of water and are fired to vitrification temperatures by conventional methods. Some of the dielectric bodies of the foregoing groups are subject to cracking while being fired. It has been found that small amounts of borates, borosilicates, or boron titanate avoids this danger and gives the bodies proper firing characteristics without materially altering the desired electrical properties.

The following tabulations give the electrical characteristics of bodies of the various foregoing group or lot definitions. In each case the materials are mixed as the preferred powder, water is added and the bodies are pressed to shape in steel molds and fired in saggers in an oxidizing atmosphere to the temperatures indicated in the tabulation, such temperature being maintained for three hours.

*Examples of Lot I*

| Composition | $BaTiO_3$, Wt. Per Cent | $PbTiO_3$, Wt. Per Cent | Firing Temp. | Dielectric Constant | |
|---|---|---|---|---|---|
| | | | | 1 kilo. | 1 meg. |
| | | | °F. | | |
| 11 | 95 | 5 | 2,400 | 640 | 210 |
| 12 | 80 | 20 | 2,300 | 1,430 | 442 |
| 13 | 50 | 50 | 2,300 | 2,100 | 1,200 |
| 14 | 20 | 80 | 2,200 | 460 | 240 |

*Examples of Lot II*

| Composition | $BaTiO_3$, Wt. Per Cent | $PbTiO_3$, Wt. Per Cent | $Ba(OH)_2 \cdot 8H_2O$, Wt. Per Cent | Dielectric Constant, 1 megacycle |
|---|---|---|---|---|
| 15 | 60 | 30 | 10 | 912 |

(The above was fired at 2,280° F.)

*Examples of Lot III*

| Composition | $SrTiO_3$, Wt. Per Cent | $PbTiO_3$, Wt. Per Cent | Firing Temp. | Dielectric Constant | |
|---|---|---|---|---|---|
| | | | | 1 kilo. | 1 meg. |
| | | | °F. | | |
| 16 | 95 | 5 | 2,350 | 310 | 220 |
| 17 | 90 | 10 | 2,350 | 323 | 280 |
| 18 | 85 | 15 | 2,350 | 320 | 300 |
| 19 | 80 | 20 | 2,350 | 340 | 310 |
| 20 | 75 | 25 | 2,300 | 600 | 560 |
| 21 | 60 | 40 | 2,150 | 790 | 804 |
| 22 | 50 | 50 | 2,150 | 895 | 910 |
| 23 | 40 | 60 | 2,100 | 742 | 740 |
| 24 | 30 | 70 | 2,100 | 560 | 510 |
| 25 | 20 | 80 | 2,100 | 295 | 280 |

*Examples of Lot IV*

| Composition | $SrTiO_3$, Wt. Per Cent | $PbTiO_3$, Wt. Per Cent | $Sr(OH)_2 \cdot 8H_2O$, Wt. Per Cent | Dielectric Constant, 1 megacycle |
|---|---|---|---|---|
| 26 | 50 | 40 | 10 | 1,190 |

(The above was fired at 2,275° F.)

*Examples of Lot V*

| Composition | $SrTiO_3$, Wt. Per Cent | $BaTiO_3$, Wt. Per Cent | $PbTiO_3$, Wt. Per Cent | Firing Temp. | Dielectric Constant | |
|---|---|---|---|---|---|---|
| | | | | | 1 kilo. | 1 meg. |
| | | | | °F. | | |
| 27 | 80 | 15 | 5 | 2,400 | 320 | 320 |
| 28 | 80 | 10 | 10 | 2,400 | 440 | 390 |
| 29 | 70 | 15 | 15 | 2,250 | 370 | 302 |
| 30 | 70 | 25 | 5 | 2,300 | 393 | 380 |
| 31 | 60 | 35 | 5 | 2,300 | 520 | 508 |
| 32 | 50 | 45 | 5 | 2,260 | 908 | 840 |

The following is an example of the strontium titanate-lead titanate mixture with boron titanate added to avoid cracking in firing:

| Composition | $SrTiO_3$, Wt. Per Cent | $PbTiO_3$, Wt. Per Cent | $B_2TiO_5$, Wt. Per Cent | Dielectric Constant, 1 megacycle |
|---|---|---|---|---|
| 33 | 60 | 36 | 4 | 865 |

(The above was fired at 2,200° F.)

In addition to the above, a composition comprised of 85% by weight of $SrTiO_3$, 10% by weight of $PbTiO_3$ and 5% by weight of $La_2O_3$ was prepared and fired at 2350° F. This body exhibited a dielectric constant of 232 at a frequency of 1 megacycle.

It may be pointed out that peak dielectric constants are attained, in all of the various mixtures set forth in the foregoing examples, when the mixed titanates are present in a definite molar ratio. In the case of the mixtures of Lot III, the peak dielectric constant appears to be attained with a mixture of 83½ parts of strontium titanate to 16½ parts of lead titanate. This is almost exactly equivalent to a molar ratio of 9 to 1.

The extremely high dielectric constants of the ceramic bodies of the present invention open new fields in the electrical arts for the application of capacitive principles of coupling and energy transmission and transformation generally.

The high capacitance materials afforded makes possible capacitive coupling between, for instance, a high tension alternating current transmission line and a telephone line. The extremely high dielectric constants of these materials make it possible to substitute capacitors where resistance connections would otherwise be employed. Application of the materials disclosed herein in the fields of pyroelectricity and supersonics is indicated and its use in the construction of crystal or condenser microphones, frequency stabilizers, amplifiers, phonograph pickups and oscillators generally will be found highly advantageous. Some of the members of the foregoing groups exhibit the electrical and mechanical characteristics of piezo electric and pyroelectric crystals.

The very high dielectric constant of these materials provides an effective substitute for clear block condenser mica as used in radio and communication work. These bodies may also be used as substitutes for paper and electrolytic condensers for use in filter and by-pass circuits. They may also be used as power factor control condensers for A. C. induction motors, as high voltage capacitors, in television, as starting devices for single phase motors, for elimination of sparking at contact points, and in analogous dielectric applications.

While specific examples of the dielectric material of the present invention are set forth by way of illustration, it is to be understood that the present invention is not to be considered limited thereto or otherwise than as defined in the appended claims.

What is claimed is:

1. A range of ceramic compositions comprising as essential constituents by weight a combination of 5 to 80 per cent of lead titanate and 95 to 20 per cent of titanate chosen from the group consisting of barium and strontium titanate, said composition containing about 25 to 45 per cent of combined titanium dioxide.

2. A range of ceramic compositions comprising as essential constituents by weight a combination of 5 to 80 per cent of lead titanate and 95 to 20 per cent of barium titanate, said composition containing substantially solely titanium dioxide which is chemically combined with oxide constituents as titanate.

3. A range of ceramic compositions comprising as essential constituents by weight a combination of 5 to 80 per cent of lead titanate and 95 to 20 per cent of strontium titanate, said composition containing substantially solely titanium dioxide which is chemically combined with oxide constituents as titanate.

4. A range of vitrified ceramic compositions consisting essentially of a combination by weight of 5 to 80 per cent of lead titanate and 95 to 20 per cent of titanate chosen from the group consisting of titanate chosen from the group consisting of barium and strontium titanate, said combination having admixed therewith an excess up to 10 molar per cent of oxide chosen from the group of barium and strontium oxides, the proportion of combined titanium dioxide in said compositions being within the range of 35 to 40 per cent.

5. A dielectric composition comprising a combination of lead titanate and barium titanate and in admixture therewith an excess up to 10 molar per cent of barium oxide, the titanates in said combination bearing complementary proportions with respect to another within a range of 80 to 5 per cent of lead titanate and 20 to 95 per cent of barium titanate, the proportion of combined titanium dioxide in said composition being within the range of 35 to 40 per cent.

6. A dielectric body comprising as essential ingredients strontium titanate and lead titanate in substantially a molar ratio of 9 to 1, said composition containing by weight about 25 to 45 per cent of titanium dioxide which is wholly combined with oxide ingredients as titanate.

EUGENE WAINER.

REFERENCES CITED

The following references are of record in the file of this patent:

UNITED STATES PATENTS

| Number | Name | Date |
|---|---|---|
| 2,369,327 | Warner | Feb. 13, 1945 |